(12) United States Patent
Kaza et al.

(10) Patent No.: US 8,447,641 B1
(45) Date of Patent: May 21, 2013

(54) SYSTEM AND METHOD FOR AUTOMATICALLY ENROLLING BUYERS INTO A NETWORK

(75) Inventors: Shrinivas K. Kaza, Fremont, CA (US); Xuan (Sunny) N. McRae, Fremont, CA (US); Dillip K. Subramani, Pleasanton, CA (US); Matthew Grant Roland, San Francisco, CA (US); Pavel Lopin, Dublin, CA (US); Georg Mueller, Pleasanton, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 525 days.

(21) Appl. No.: 12/748,632

(22) Filed: Mar. 29, 2010

(51) Int. Cl.
G06Q 10/00 (2006.01)

(52) U.S. Cl.
USPC ........................................... 705/7.14

(58) Field of Classification Search
USPC ................................. 705/7.11, 7.14
See application file for complete search history.

(56) References Cited

U.S. PATENT DOCUMENTS

| | | |
|---|---|---|
| 2,005,003 A | 6/1935 | Patton et al. |
| 3,653,480 A | 4/1972 | Yamamoto et al. |
| 3,938,090 A | 2/1976 | Borison et al. |
| 4,050,375 A | 9/1977 | Orlens |
| 4,141,078 A | 2/1979 | Bridges et al. |
| 4,205,780 A | 6/1980 | Burns et al. |
| 4,264,808 A | 4/1981 | Owens et al. |
| 4,321,672 A | 3/1982 | Braun et al. |
| 4,385,285 A | 5/1983 | Horst et al. |
| 4,396,985 A | 8/1983 | Ohara |
| 4,443,027 A | 4/1984 | McNeely et al. |
| 4,453,074 A | 6/1984 | Weinstein |
| 4,454,414 A | 6/1984 | Benton |
| RE31,692 E | 10/1984 | Tyburski et al. |
| 4,495,018 A | 1/1985 | Vohrer |
| 4,575,621 A | 3/1986 | Dreifus |
| 4,605,844 A | 8/1986 | Haggan |
| 4,614,861 A | 9/1986 | Pavlov et al. |
| 4,617,457 A | 10/1986 | Myers et al. |
| 4,650,981 A | 3/1987 | Foletta |

(Continued)

FOREIGN PATENT DOCUMENTS

| | | |
|---|---|---|
| EP | 0421808 | 4/1991 |
| EP | 0665486 | 8/1995 |

(Continued)

OTHER PUBLICATIONS

Alabama Department of Revenue Selects Unisys for Imaging Solution to Speed Tax Returns, Bus. Wire, Sep. 6, 1995.

(Continued)

*Primary Examiner* — Romain Jeanty
(74) *Attorney, Agent, or Firm* — Lowenstein Sandler LLP

(57) ABSTRACT

The present invention is a system and computer-implemented method for automatically enrolling and upgrading a buyer into a pre-existing network in order to conduct business with one or more sellers with minimum efforts and consistent quality. The method includes providing to the buyer, via a programmable computer, multiple business models for selection. The method also includes retrieving and sending to the buyer a set of pre-configured business processes to select based on the model chosen by the buyer. The method further includes generating required test cases to validate the selected best business process and tracking and certifying the test cases followed by deploying a live version of the selected best business process.

25 Claims, 3 Drawing Sheets

U.S. PATENT DOCUMENTS

| | | |
|---|---|---|
| 4,672,377 A | 6/1987 | Murphy et al. |
| 4,694,397 A | 9/1987 | Grant et al. |
| 4,697,072 A | 9/1987 | Kawana |
| 4,700,055 A | 10/1987 | Kashkashian |
| 4,701,601 A | 10/1987 | Francini et al. |
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston et al. |
| 4,823,264 A | 4/1989 | Deming |
| 4,845,347 A | 7/1989 | McCrindle |
| 4,859,837 A | 8/1989 | Halpern |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,977,501 A | 12/1990 | Lefevre |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,072,380 A | 12/1991 | Randelman et al. |
| 5,080,748 A | 1/1992 | Bonomi |
| 5,097,115 A | 3/1992 | Ogasawara |
| 5,111,395 A | 5/1992 | Smith |
| 5,121,945 A | 6/1992 | Thomson et al. |
| 5,122,950 A | 6/1992 | Mee et al. |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,224,034 A | 6/1993 | Katz et al. |
| 5,225,978 A | 7/1993 | Peterson |
| 5,237,159 A | 8/1993 | Stephens |
| 5,237,620 A | 8/1993 | Deaton |
| 5,257,486 A | 11/1993 | Holmwall |
| 5,265,007 A | 11/1993 | Barnhard, Jr. et al. |
| 5,276,311 A | 1/1994 | Hennige |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe et al. |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | Van Horn et al. |
| 5,373,550 A | 12/1994 | Campbell |
| 5,382,784 A | 1/1995 | Eberhardt |
| 5,396,417 A | 3/1995 | Burks et al. |
| 5,402,474 A | 3/1995 | Miller |
| 5,412,190 A | 5/1995 | Kopesec et al. |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glaser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,495,981 A | 3/1996 | Warther |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,532,689 A | 7/1996 | Bueno |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Kleese |
| 5,590,196 A | 12/1996 | Moreau |
| 5,592,377 A | 1/1997 | Lipkin |
| 5,592,378 A | 1/1997 | Cameron |
| 5,599,528 A | 2/1997 | Igaki |
| 5,602,936 A | 2/1997 | Green et al. |
| 5,603,025 A | 2/1997 | Tabb |
| 5,615,109 A | 3/1997 | Eder |
| 5,617,474 A | 4/1997 | Ditzig et al. |
| 5,619,558 A | 4/1997 | Jheeta |
| 5,621,201 A | 4/1997 | Langhans |
| 5,621,812 A | 4/1997 | Deaton et al. |
| 5,638,457 A | 6/1997 | Deaton et al. |
| 5,640,577 A | 6/1997 | Scharmer |
| 5,642,419 A | 6/1997 | Rosen |
| 5,642,485 A | 6/1997 | Deaton et al. |
| 5,644,723 A | 7/1997 | Deaton et al. |
| 5,644,778 A | 7/1997 | Burks et al. |
| 5,649,114 A | 7/1997 | Deaton et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,687,250 A | 11/1997 | Curley et al. |
| 5,687,322 A | 11/1997 | Deaton et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,748,780 A | 5/1998 | Stolfo |
| 5,751,842 A | 5/1998 | Eccles et al. |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson et al. |
| 5,784,696 A | 7/1998 | Melnikof |
| 5,787,403 A | 7/1998 | Randle |
| 5,789,732 A | 8/1998 | McMahon et al. |
| 5,793,861 A | 8/1998 | Haigh |
| 5,794,221 A | 8/1998 | Egendorf |
| 5,796,827 A | 8/1998 | Coppersmith et al. |
| 5,802,498 A | 9/1998 | Comesanas |
| 5,802,499 A | 9/1998 | Sampson et al. |
| 5,819,238 A | 10/1998 | Fernholz |
| 5,826,241 A | 10/1998 | Stein |
| 5,826,245 A | 10/1998 | Sandberg-Diment |

| | | | | | | |
|---|---|---|---|---|---|---|
| 5,832,090 | A | 11/1998 | Raspotnik | 6,052,674 A | 4/2000 | Zervides et al. |
| 5,832,447 | A | 11/1998 | Rieker | 6,058,380 A | 5/2000 | Anderson et al. |
| 5,832,457 | A | 11/1998 | O'Brien et al. | 6,058,381 A | 5/2000 | Nelson |
| 5,832,460 | A | 11/1998 | Bednar | 6,061,665 A | 5/2000 | Bahreman |
| 5,832,463 | A | 11/1998 | Funk | 6,064,764 A | 5/2000 | Bhaskaran et al. |
| 5,832,464 | A | 11/1998 | Houvener et al. | 6,064,987 A | 5/2000 | Walker et al. |
| 5,832,488 | A | 11/1998 | Eberhardt | 6,065,675 A | 5/2000 | Teicher |
| 5,835,580 | A | 11/1998 | Fraser | 6,067,524 A | 5/2000 | Byerly et al. |
| 5,835,603 | A | 11/1998 | Coutts | 6,070,150 A | 5/2000 | Remington et al. |
| 5,835,899 | A | 11/1998 | Rose et al. | 6,070,798 A | 6/2000 | Nethery |
| 5,852,811 | A | 12/1998 | Atkins | 6,073,104 A | 6/2000 | Field |
| 5,852,812 | A | 12/1998 | Reeder | 6,073,113 A | 6/2000 | Guinan |
| 5,859,419 | A | 1/1999 | Wynn | 6,076,072 A | 6/2000 | Libman |
| 5,864,609 | A | 1/1999 | Cross et al. | 6,078,907 A | 6/2000 | Lamm |
| 5,870,456 | A | 2/1999 | Rogers | 6,081,790 A | 6/2000 | Rosen |
| 5,870,721 | A | 2/1999 | Norris | 6,085,168 A | 7/2000 | Mori et al. |
| 5,870,723 | A | 2/1999 | Pare | 6,088,683 A | 7/2000 | Jalili |
| 5,870,725 | A | 2/1999 | Bellinger et al. | 6,088,685 A | 7/2000 | Kiron et al. |
| 5,873,072 | A | 2/1999 | Kight | 6,088,686 A | 7/2000 | Walker et al. |
| 5,878,141 | A | 3/1999 | Daly et al. | 6,092,056 A | 7/2000 | Tull, Jr. et al. |
| 5,883,377 | A | 3/1999 | Chapin, Jr. | 6,092,057 A | 7/2000 | Zimmerman et al. |
| 5,884,288 | A | 3/1999 | Chang | 6,098,053 A | 8/2000 | Slater |
| 5,884,290 | A | 3/1999 | Smorodinsky et al. | 6,098,070 A | 8/2000 | Maxwell |
| 5,897,625 | A | 4/1999 | Gustin | 6,101,479 A | 8/2000 | Shaw |
| 5,898,157 | A | 4/1999 | Mangili et al. | 6,105,007 A | 8/2000 | Norris |
| 5,903,881 | A | 5/1999 | Schrader | 6,105,011 A | 8/2000 | Morrison, Jr. |
| 5,907,142 | A | 5/1999 | Kelsey | 6,108,639 A | 8/2000 | Walker et al. |
| 5,910,896 | A | 6/1999 | Hahn-Carlson | 6,110,044 A | 8/2000 | Stern |
| 5,910,988 | A | 6/1999 | Ballard | 6,111,858 A | 8/2000 | Greaves et al. |
| 5,915,246 | A | 6/1999 | Patterson et al. | 6,115,690 A | 9/2000 | Wong |
| 5,917,965 | A | 6/1999 | Cahill et al. | 6,119,106 A | 9/2000 | Mersky et al. |
| 5,920,847 | A | 7/1999 | Kolling et al. | 6,119,107 A | 9/2000 | Polk |
| 5,930,778 | A | 7/1999 | Geer | 6,125,354 A | 9/2000 | MacFarlane et al. |
| 5,940,811 | A | 8/1999 | Norris | 6,128,599 A | 10/2000 | Walker et al. |
| 5,940,844 | A | 8/1999 | Cahill et al. | 6,128,602 A | 10/2000 | Northington et al. |
| 5,943,656 | A | 8/1999 | Crooks | 6,128,603 A | 10/2000 | Dent et al. |
| 5,945,653 | A | 8/1999 | Walker et al. | 6,129,273 A | 10/2000 | Shah |
| 5,949,044 | A | 9/1999 | Walker et al. | 6,138,118 A | 10/2000 | Koppstein et al. |
| 5,950,174 | A | 9/1999 | Brendzel | 6,138,917 A | 10/2000 | Chapin, Jr. |
| 5,956,700 | A | 9/1999 | Landry | 6,141,666 A | 10/2000 | Tobin |
| 5,960,411 | A | 9/1999 | Hartman et al. | 6,144,946 A | 11/2000 | Iwamura |
| 5,963,659 | A | 10/1999 | Cahill et al. | 6,148,293 A | 11/2000 | King |
| 5,963,925 | A | 10/1999 | Kolling et al. | 6,149,055 A | 11/2000 | Gatto |
| 5,966,698 | A | 10/1999 | Pollin | 6,149,056 A | 11/2000 | Stinson et al. |
| 5,970,475 | A | 10/1999 | Barnes et al. | 6,173,272 B1 | 1/2001 | Thomas et al. |
| 5,978,780 | A | 11/1999 | Watson | 6,181,837 B1 | 1/2001 | Cahill et al. |
| 5,987,434 | A | 11/1999 | Libman | 6,185,542 B1 | 2/2001 | Moran et al. |
| 5,987,435 | A | 11/1999 | Weiss et al. | 6,185,544 B1 | 2/2001 | Sakamoto et al. |
| 5,987,436 | A | 11/1999 | Halbrook | 6,188,309 B1 | 2/2001 | Levine |
| 5,987,439 | A | 11/1999 | Gustin | 6,202,054 B1 | 3/2001 | Lawlor et al. |
| 5,991,749 | A | 11/1999 | Morrill, Jr. | 6,205,433 B1 | 3/2001 | Boesch et al. |
| 5,991,750 | A | 11/1999 | Watson | 6,213,391 B1 | 4/2001 | Lewis |
| 6,000,832 | A | 12/1999 | Franklin et al. | 6,223,168 B1 | 4/2001 | McGurl et al. |
| 6,002,767 | A | 12/1999 | Kramer | 6,227,447 B1 | 5/2001 | Campisano |
| 6,003,762 | A | 12/1999 | Hayashida | 6,233,565 B1 | 5/2001 | Lewis et al. |
| 6,006,205 | A | 12/1999 | Loeb et al. | 6,233,566 B1 | 5/2001 | Levine |
| 6,006,208 | A | 12/1999 | Forst et al. | 6,236,972 B1 | 5/2001 | Shkedy |
| 6,009,442 | A | 12/1999 | Chen et al. | 6,240,444 B1 | 5/2001 | Fin et al. |
| 6,014,636 | A | 1/2000 | Reeder | 6,243,689 B1 | 6/2001 | Norton |
| 6,016,482 | A | 1/2000 | Molinari et al. | 6,267,292 B1 | 7/2001 | Walker et al. |
| 6,016,484 | A | 1/2000 | Williams et al. | 6,278,981 B1 | 8/2001 | Dembo et al. |
| 6,018,718 | A | 1/2000 | Walker et al. | 6,289,322 B1 | 9/2001 | Kitchen et al. |
| 6,026,388 | A | 2/2000 | Liddy et al. | 6,292,789 B1 | 9/2001 | Schutzer |
| 6,029,139 | A | 2/2000 | Cunningham et al. | 6,301,379 B1 | 10/2001 | Thompson et al. |
| 6,029,153 | A | 2/2000 | Bauchner et al. | 6,301,567 B1 | 10/2001 | Leong et al. |
| 6,032,133 | A | 2/2000 | Hilt et al. | 6,304,858 B1 | 10/2001 | Mosler et al. |
| 6,032,134 | A | 2/2000 | Weissman | 6,305,603 B1 | 10/2001 | Grunbok, Jr. et al. |
| 6,032,136 | A | 2/2000 | Brake, Jr. et al. | 6,308,887 B1 | 10/2001 | Korman et al. |
| 6,032,137 | A | 2/2000 | Hallard | 6,321,212 B1 | 11/2001 | Lange |
| 6,035,281 | A | 3/2000 | Crosskey et al. | 6,324,524 B1 | 11/2001 | Lent et al. |
| 6,035,285 | A | 3/2000 | Schlect et al. | 6,327,575 B1 | 12/2001 | Katz |
| 6,035,287 | A | 3/2000 | Stallaert et al. | 6,338,047 B1 | 1/2002 | Wallman |
| 6,036,099 | A | 3/2000 | Leighton | 6,338,049 B1 | 1/2002 | Walker et al. |
| 6,038,553 | A | 3/2000 | Hyde, Jr. | 6,341,724 B2 | 1/2002 | Campisano |
| 6,041,312 | A | 3/2000 | Bickerton et al. | 6,343,279 B1 | 1/2002 | Bissonette et al. |
| 6,041,315 | A | 3/2000 | Pollin | 6,349,290 B1 | 2/2002 | Horowitz et al. |
| 6,044,362 | A | 3/2000 | Neely | 6,363,164 B1 | 3/2002 | Jones et al. |
| 6,045,039 | A | 4/2000 | Stinson et al. | 6,363,364 B1 | 3/2002 | Nel |
| 6,047,261 | A | 4/2000 | Siefert | 6,363,365 B1 | 3/2002 | Kou |

| | | |
|---|---|---|
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,405,181 B2 | 6/2002 | Lent et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,424,949 B1 | 7/2002 | Deaton et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,485,922 B1 | 11/2002 | Erickson et al. |
| 6,490,568 B1 | 12/2002 | O'Mara et al. |
| 6,493,685 B1 | 12/2002 | Ensel et al. |
| 6,513,019 B2 | 1/2003 | Lewis |
| 6,535,896 B2 | 3/2003 | Britton et al. |
| 6,536,663 B1 | 3/2003 | Lozier et al. |
| 6,554,185 B1 | 4/2003 | Montross et al. |
| 6,560,581 B1 | 5/2003 | Fox et al. |
| 6,567,791 B2 | 5/2003 | Lent et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,607,127 B2 | 8/2003 | Wong |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| D490,840 S | 6/2004 | Arakaki et al. |
| D491,186 S | 6/2004 | Arakaki et al. |
| D491,953 S | 6/2004 | Arakaki et al. |
| D496,365 S | 9/2004 | Liu et al. |
| D498,236 S | 11/2004 | Liu et al. |
| 6,820,058 B2 | 11/2004 | Wood et al. |
| 6,824,066 B2 | 11/2004 | Weyant |
| 6,825,940 B1 | 11/2004 | Wu et al. |
| 6,860,375 B2 | 3/2005 | Hallowell et al. |
| 6,865,547 B1 | 3/2005 | Brake, Jr. et al. |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| RE38,957 E | 1/2006 | Laussermair et al. |
| 6,999,943 B1 | 2/2006 | Johnson et al. |
| 7,004,382 B2 | 2/2006 | Sandru |
| 7,025,256 B1 | 4/2006 | Drummond et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,104,443 B1 | 9/2006 | Paul et al. |
| 7,133,846 B1 | 11/2006 | Ginter et al. |
| 7,177,836 B1 | 2/2007 | German et al. |
| 7,194,437 B1 | 3/2007 | Britto et al. |
| 7,200,255 B2 | 4/2007 | Jones et al. |
| 7,228,155 B2 | 6/2007 | Saunders |
| 7,249,112 B2 | 7/2007 | Berardi et al. |
| 7,312,707 B1 | 12/2007 | Bishop et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom |
| RE40,220 E | 4/2008 | Nichols et al. |
| 7,380,707 B1 | 6/2008 | Fredman |
| 7,401,048 B2 | 7/2008 | Rosedale et al. |
| 7,493,288 B2 | 2/2009 | Bishop et al. |
| 7,546,272 B2 | 6/2009 | Loy |
| 7,587,363 B2 | 9/2009 | Cataline et al. |
| 7,954,091 B2 * | 5/2011 | Li et al. .................. 717/135 |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0027441 A1 | 10/2001 | Wankmueller |
| 2001/0032139 A1 | 10/2001 | Debonnett, Jr. |
| 2001/0034663 A1 | 10/2001 | Teveler et al. |
| 2001/0037300 A1 | 11/2001 | Miyazaki et al. |
| 2001/0037309 A1 | 11/2001 | Vrain |
| 2001/0038033 A1 | 11/2001 | Habib |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0032651 A1 | 3/2002 | Embrey |
| 2002/0038363 A1 | 3/2002 | MacLean |
| 2002/0046169 A1 | 4/2002 | Keresman, III et al. |
| 2002/0047316 A1 | 4/2002 | Chitayat |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 | 6/2002 | MacKay |
| 2002/0084321 A1 | 7/2002 | Martens et al. |
| 2002/0087415 A1 | 7/2002 | Allen et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0128981 A1 | 9/2002 | Kawan et al. |
| 2002/0138390 A1 | 9/2002 | May |
| 2002/0138398 A1 | 9/2002 | Kalin et al. |
| 2002/0156723 A1 | 10/2002 | Lilly et al. |
| 2002/0169658 A1 | 11/2002 | Adler |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0188486 A1 * | 12/2002 | Gil et al. ........................ 705/7 |
| 2002/0194081 A1 | 12/2002 | Perkowski |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0018567 A1 | 1/2003 | Flitcroft et al. |
| 2003/0028481 A1 | 2/2003 | Flitcroft et al. |
| 2003/0037002 A1 | 2/2003 | Higgins et al. |
| 2003/0040959 A1 | 2/2003 | Fei et al. |
| 2003/0046262 A1 | 3/2003 | Albanese et al. |
| 2003/0055675 A1 | 3/2003 | Klein Twennaar |
| 2003/0069780 A1 | 4/2003 | Hailwood et al. |
| 2003/0097335 A1 | 5/2003 | Moskowitz et al. |
| 2003/0100803 A1 | 5/2003 | Lu et al. |
| 2003/0105641 A1 | 6/2003 | Lewis |
| 2003/0110070 A1 | 6/2003 | De Goeij |
| 2003/0110136 A1 | 6/2003 | Wells et al. |
| 2003/0110442 A1 | 6/2003 | Battle |
| 2003/0120686 A1 | 6/2003 | Kim et al. |
| 2003/0130945 A1 | 7/2003 | Force et al. |
| 2003/0130952 A1 | 7/2003 | Bell et al. |
| 2003/0144942 A1 | 7/2003 | Sobek |
| 2003/0187787 A1 | 10/2003 | Freund |
| 2003/0187789 A1 | 10/2003 | Karas et al. |
| 2003/0191710 A1 | 10/2003 | Green et al. |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0218066 A1 | 11/2003 | Fernandes et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0010465 A1 | 1/2004 | Michalski et al. |
| 2004/0019605 A1 | 1/2004 | Keown et al. |
| 2004/0029569 A1 | 2/2004 | Khan et al. |
| 2004/0049451 A1 | 3/2004 | Berardi |

| | | |
|---|---|---|
| 2004/0049456 A1 | 3/2004 | Dreyer |
| 2004/0064409 A1 | 4/2004 | Kight et al. |
| 2004/0078328 A1 | 4/2004 | Talbert et al. |
| 2004/0094624 A1 | 5/2004 | Fernandes et al. |
| 2004/0133516 A1 | 7/2004 | Buchanan et al. |
| 2004/0149544 A1 | 8/2004 | Dal Ferro |
| 2004/0159700 A1 | 8/2004 | Khan et al. |
| 2004/0201735 A1 | 10/2004 | Baron |
| 2004/0210498 A1 | 10/2004 | Freund |
| 2004/0228514 A1 | 11/2004 | Houle et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0252012 A1 | 12/2004 | Beenau et al. |
| 2004/0254837 A1 | 12/2004 | Roshkoff |
| 2004/0260607 A1 | 12/2004 | Robbins et al. |
| 2005/0021466 A1 | 1/2005 | Buchanan et al. |
| 2005/0033619 A1 | 2/2005 | Barnes et al. |
| 2005/0033690 A1 | 2/2005 | Antognini et al. |
| 2005/0035847 A1 | 2/2005 | Bonalle et al. |
| 2005/0040242 A1 | 2/2005 | Beenau et al. |
| 2005/0055254 A1 | 3/2005 | Schmidtberg et al. |
| 2005/0077349 A1 | 4/2005 | Bonalle et al. |
| 2005/0086178 A1 | 4/2005 | Xie et al. |
| 2005/0091156 A1 | 4/2005 | Hailwood et al. |
| 2005/0097046 A1 | 5/2005 | Singfield |
| 2005/0097050 A1 | 5/2005 | Orcutt |
| 2005/0116024 A1 | 6/2005 | Beenau et al. |
| 2005/0144059 A1 | 6/2005 | Schuessler |
| 2005/0171898 A1 | 8/2005 | Bishop |
| 2005/0177480 A1 | 8/2005 | Huang |
| 2005/0209954 A1 | 9/2005 | Asher et al. |
| 2005/0228751 A1 | 10/2005 | Keown et al. |
| 2005/0261955 A1 | 11/2005 | Humble et al. |
| 2006/0036553 A1 | 2/2006 | Gupta et al. |
| 2006/0041540 A1 | 2/2006 | Shannon et al. |
| 2006/0106650 A1 | 5/2006 | Bush |
| 2006/0106717 A1 | 5/2006 | Randle et al. |
| 2006/0136335 A1 | 6/2006 | Ferguson, III |
| 2006/0161501 A1 | 7/2006 | Waserstein et al. |
| 2006/0167989 A1 | 7/2006 | Bashen et al. |
| 2006/0178986 A1 | 8/2006 | Giordano et al. |
| 2006/0206427 A1 | 9/2006 | Love et al. |
| 2006/0259390 A1 | 11/2006 | Rosenberger |
| 2006/0282389 A1 | 12/2006 | Gupte |
| 2006/0287953 A1 | 12/2006 | Chauhan |
| 2007/0005498 A1 | 1/2007 | Cataline et al. |
| 2007/0138255 A1 | 6/2007 | Carreon et al. |
| 2007/0265924 A1 | 11/2007 | Schwarz |
| 2007/0288334 A1 | 12/2007 | Creedle et al. |
| 2008/0010202 A1 | 1/2008 | Schwarz |
| 2008/0116283 A1 | 5/2008 | Newbrough et al. |
| 2008/0193008 A1 | 8/2008 | Mount et al. |
| 2009/0043651 A1 | 2/2009 | Schwarz |
| 2010/0114823 A1* | 5/2010 | Sykes et al. ............ 707/626 |

FOREIGN PATENT DOCUMENTS

| | | |
|---|---|---|
| EP | 1014318 | 6/2000 |
| JP | 2001-266039 | 9/2001 |
| JP | 2002-024618 | 1/2002 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |
| JP | 2007-088822 | 4/2007 |
| WO | 91/16691 | 10/1991 |
| WO | 93/08545 | 4/1993 |
| WO | 94/28497 | 12/1994 |
| WO | 96/08783 | 3/1996 |
| WO | 96/12242 | 4/1996 |
| WO | 97/14108 | 4/1997 |
| WO | 97/45796 | 12/1997 |
| WO | 97/45814 | 12/1997 |
| WO | 98/09260 | 3/1998 |
| WO | 99/10823 | 3/1999 |
| WO | 99/49404 | 9/1999 |
| WO | 00/18060 | 3/2000 |
| WO | 00/39979 | 7/2000 |
| WO | 01/75730 | 10/2001 |
| WO | 02/063432 | 8/2002 |
| WO | 04/079603 | 9/2004 |

OTHER PUBLICATIONS

Andersen Consulting, Image-Based Transaction Processing: The Banking Industry's Challenge for the 1990s and Beyond (1989).

Andrew Gluck, Creating a global cash-management game plan, Bank Systems & Tech., Feb. 1997, at 28.

Andrew Reinbach, Chase steps up treasury system, Bank Systems & Tech., Nov. 1995, at 29.

Angela Maher & Jeffrey Troutman, PNC Bank Treasury Management, Payor's Prescription for Painless Migration to Receipt of Electronic Healthcare Payments and Remittance Advices (Dec. 2001).

Angela Maher & Jeffrey Troutman, PNC Bank Treasury Management, Provider's Prescription for Painless Migration to Receipt of Electronic Healthcare Payments and Remittance Advices (Dec. 2001).

Ann Keeton, Bank of America Completes Its Rollout of 'Paperless' Processing of Payments, Wall St. J., Nov. 1, 1999, at B13.

BancTec Selects Alchemy CD-Based Archival Solution for Remittance Processing System, Bus. Wire, May 6, 1998.

Bank of America Provides Nationwide Lockbox Services, Press Release, Oct. 20, 1999.

Bridget Malone, Internet Billing: Building a Secure Global Market, Electronic Commerce World, Jan. 2001, at 46.

Caere introduces the Model 1800 document remittance processor, Bus. Wire, Oct. 19, 1995.

CardFlash, Daily Payment Card News, Sep. 23, 2004.

CES/NaBanco introduces stored value card technology; Blockbuster Video is first merchant partner, Bus. Wire, Jan. 15, 1996.

Chapter Reports: Texas Chapter, Work Process Improvement Today, Apr. 1998.

Chase Image-Enables NY Wholesale Lockbox Facility with VICOR Technology, Press Release, Aug. 31, 1999.

Chase Manhattan introduces new FEDI payables product, Cash Mgmt. News, May 1995.

Chase offers image lockbox for Europe, Bank Systems & Tech., Aug. 1997, at 37.

Chasing the Global Trend, Cash Mgmt. News, Dec. 1995, at 8.

Christy Tauhert, Lock Box Solutions Reengineer Payment, Insurance & Tech., Aug. 1996, at 22.

Cindy Jensen, U.S. Bank Effectively Manages Complexity, Today, May/Jun. 2006.

Council for Electronic Billing and Payment, Business-to-Business EIPP: Presentment Models and Payment Options Part One (Jan. 2001).

Council for Electronic Billing and Payment, Business-to-Business EIPP: Presentment Models and Payment Options Part Two (Jan. 2001).

Crestar to Introduce New Advanced Cash Management System Based on IA Corp. Software, Bus. Wire, Oct. 28, 1996.

Dieter Wackerow, MQSeries Enterprise Application Integration Center, MQ Series Primer, Oct. 1999.

DMP and IMR Partner to Develop Electronic Archiving Solution for Wholesale Lockboxes and Remittance Processing, Bus. Wire, Mar. 24, 1998.

Douglas Armstrong, Norwest eases difficulty of interstate banking Bank's customers may use the same account number at any branch, Milwaukee J. Sentinel, Oct. 12, 1995, at 2.

Du Pont's Electronic Payments System, Corporate EFT Report, Jan. 11, 1989.

Elena Malykhina, Cell Phone Software Formats Check for Online Banking, InformationWeek, Jan. 24, 2008.

Erica Goode, on Profit, Loss and the Mysteries of the Mind, N.Y. Times, Nov. 5, 2002.

Fidelity Helps Fund Sellers Trim the Taxes They'll Owe, Wall St. J., Nov. 7, 2002.

First Data markets stored-value cards, Cards Int'l, Jan. 30, 1996, at 5.

Frank J. Derfler, Jr. & Les Freed, How Networks Work 144-51 (2003).

Get ready for electronic commerce, ABA Banking J., Jun. 1995, at 47.
Gordon Platt, Online billing & payments: Technology Providers Multiply, Global Fin., Apr. 1, 2001.
Gregory Zuckerman, The Hedge-Fund Craze, Wall St. J., Jun. 12, 2002.
Henry Urrows & Elizabeth Urrows, Automated imaging in financial services, 11 Document Image Automation 259 (Sep.-Oct. 1991).
IA announced installation at QuestPoint of first client/server cash management system with check image storage compatible with IBM, NCR and Unisys, Bus. Wire, May 29, 1997.
IA Corp. Announces New CheckVision Products, Bus. Wire, Apr. 1, 1996.
IA Corp. shows complex transaction processing software WorkVision at AIIM, Bus. Wire, Apr. 14, 1997.
IA Corp. Wins Contract With Comercia to Install the First Digital All Items Archive, Bus. Wire, Jan. 9, 1997.
IA Corporation Becomes a Major Player in Image-Based Cash Management Solutions, Bus. Wire, Nov. 24, 1995.
IA Presents New Advanced Cash Management Software at TMA to Link Banks and Their Corporate Customers, Bus. Wire, Nov. 18, 1996.
Ian McDonald, The Stars in the Sky Flicker, and Fund Stars Do the Same, Wall St. J., Jan. 15, 2003.
IA's RemitVision adapted by Harris Bank for CD-ROM and Online Customer Viewing of Check and Remittance Documents, Bus. Wire, May 28, 1996.
In Brief: Wachovia-InteliData Deal, Am. Banker, May 7, 2002.
Initial Launch to 200 Credit Unions, USA Today, Jun. 27, 2002.
Intelidata Technologies Corporation, Form 10-K for fiscal year ended Dec. 31, 2001.
J.D. Carreker, Electronic Check Presentment: Capturing new technology, Banking Mgmt., Mar./Apr. 1995, at 32.
J.P. Buckley et al., Processing noisy structured textual data using a fuzzy matching approach: application to postal address errors, 4 Soft Computing 195 (2000).
Jeetu Patel & Joe Fenner, E-Billing Moves Into B2B, Imaging & Document Solutions, Jan. 2001, at p. 44.
Jeetu Patel, B-to-B E-Billing Heats Up—Business-to-business electronic billing is more complex than the business-to-consumer model, but the potential payoffs are bigger, InformationWeek, Oct. 23, 2000.
John C. Bogle, Founder and Former Chairman, The Vanguard Group, Remarks to the '40 Act Institute of Practising Law Institute: Mutual Funds at the Millennium—Fund Directors and Fund Myths (May 15, 2000).
John Shannon, New lockbox platform due out at NationsBank, Bank Systems & Tech., Feb. 1998, at 38.
Jonathan Clements, Harsh Truth: Your Investments Likely Won't Make Any Money, Wall St. J., Nov. 27, 2002.
Keith Lamond, Credit Card Transactions Real World and Online, available at, http://www.virtualschool.edu/mon/ElectronicProperty/klamond/credit_card.htm (last visited Jul. 8, 2005).
Kristen French, Investors Worry CheckFree Being Chased from its Own Game, TheStreet.com, Jun. 20, 2001.
Liz Moyer, Bank of Montreal to Install Imaging System by Unisys for Retail Lockbox Services, Am. Banker, Oct. 22, 1996, at 19.
Liz Moyer, KeyCorp Joins Trend to Check Imaging Lockbox, Am. Banker, Aug. 23, 1996.
M. Williams, FRIIS, Goodbye to paper?, ABA Banking J., Mar. 1989, at 61.
Mark Arend, Bank applications fuel optical storage market, ABA Banking J., Oct. 1991, at 77.
Melinda Norris, First Data Unit Develops Blockbuster Cash Card, Omaha World Herald, Jan. 19, 1996, at 16.
NationsBank rolls out first wholesale lockbox imaging, Potomac, Aug. 3, 1995, at 1.

NCR introduces 7780 item processing system, Bus. Wire, Mar. 11, 1992.
Newsbyte, Visa & Carnegie Mellon Plan Online Payment Scheme, 1995 WL 2205732, Feb. 15, 1995.
Nokia Announces the World's First NFC Enabled Mobile Product for Contactless Payment and Ticketing, PR Newswire, Feb. 9, 2005.
Offer: Book Yourself Free Cassettes, Birmingham Post, Mar. 25, 2000, at 16.
Operating in a multi-currency environment, Aslamoney, Oct. 1995, at 6.
Patricia A. Murphy, E-Billing: New Age Electronic Data; Interchange or Something Better?, Bank Tech. News, Jul. 2000, at 43.
Paul Williams, IBM UK Laboratories Ltd., IBM MQSeries Commercial Messaging, ACM SIGICE Bulletin, Apr. 1995.
Payment Data Systems files patent on debit card payment solution, Am. City Business J., Mar. 5, 2004.
PNC Bank Add Chicago to National Lockbox Network, PR Newswire, Nov. 5, 1997.
Priya Malhotra, Clearing House Enumerates e-Payment Ills, Am Banker, Aug. 13, 2002.
Richard J. Maturi, Personal Finance; When you need to send cash in a flash, N.Y. Times, Sep. 25, 1988, at A7.
Robert M. Hunt, Federal Reserve Bank of Philadelphia, Working Paper No. 03-10: An Introduction to the Economics of Payment Card Networks (Jun. 2003).
Robert M. Hunt, An Introduction to the Economics of Payment Card Networks, Rev. Network Econ., Jun. 2003, at 80.
Scott Leibs, Internet Billing Gets Its Due, CFO, Feb. 1, 2001, at 30.
Shawmut Bank Provides Lockbox Customers Real-Time, On-Line Electronic Exception Processing, Bus. Wire, Jan. 9, 1996.
Sherree DeCovney, Net scope, Banking Tech., May 1997, at 28.
Simultaneous Image Capture, Bank News, Oct. 1996, at 10.
State of Minnesota using AT&T imaging solution to reengineer sales tax paying process, Bus. Wire, Apr. 18, 1994.
Stephen M. Matyas, Digital Signatures—An Overview, 3 Computer Networks 87 (1979).
Steve Bills, Chase Pact Done, What's Next for Web Vendors?, Am. Banker, Jun. 3, 2002, at 23.
Steve Forbes, Fact and Comment, Forbes, Sep. 30, 2002, at 33.
Steven Marjanovic, Corporate Services: Chase Gears Up Global Payments System Series: 16, Am. Banker, Sep. 11, 1995, at 41.
Steven Marjanovic, NationsBank offers lockbox imaging, Am. Banker, Jul. 3, 1995, at 20.
Systems spell change for foreign exchange, Global Investor, Nov. 1996, at 18.
Terrie Miller & Henry Yan, When custody governs, Benefits Canada, Feb. 1998, at 33.
The payments system gets a new image, ABA Banking J., Mar. 1990, at 84.
Thomas P. Fitch, Image Technology brings lockbox breakthroughs, Corp. Cashflow Magazine, Sep. 1995, at 16.
U.S. Appl. No. 60/133,577, filed May 11, 1999.
Valerie Block, Blockbuster Running Test of a Stored Value Card, Am. Banker, Sep. 1, 1995.
Wausau Financial Systems' ImageRPS and OPEX interface a perfect math, Work Process Improvement Today, Dec. 1997.
Wells Fargo Rolls out Nationwide Lockbox Check Conversion, PR Newswire, Apr. 22, 2003.
Wendy S. Mead, Two Banks' Imaging Deals Target Fee Revenue Increases, Am. Banker, May 9, 1997, at 11.
Wholesale lockbox imaging, ABA Banking J., Feb. 1, 1993.

* cited by examiner

Business Model: PTP Process 1

Total Invoice Outsourcing (US)

SYSTEM AND METHOD FOR AUTOMATICALLY ENROLLING BUYERS INTO A NETWORK

FIELD OF THE INVENTION

This invention relates to the field of software and computer network systems. In particular, the invention relates to automatic enrollment of buyers into the network systems configured to conduct business transaction with one or more sellers.

BACKGROUND OF THE INVENTION

Currently there exists a traditional method of integrating customers into the existing network architectures. This traditional process includes manually collecting data related to the accounting information required from each of the customers, using the data to create a business process model that is custom designed for the customer, configure and provide training to the customers on the business process model, testing and certifying the model and finally migrating and deploying the buyer into the existing network. This process takes about six to nine months of time from the initial stage to the final step of integration and includes high operating and labor costs.

Thus, there is a need to streamline the traditional processing by providing a solution which includes an automated process of providing for an efficient and accelerated integration of the buyers into the network. This automated process can be configured and deployed quickly, inexpensively and with minimal IT resources.

SUMMARY

The present invention is a computer-implemented system and a method for automatic enrollment of a buyer into a network configured for conducting a business transaction with a supplier.

In one embodiment of the present invention, the method includes providing to a buyer, via a programmable computer, at least one selectable business model, presenting to the buyer, via the programmable computer, a set of pre-configured business processes based on the selected model and receiving from the buyer, via the programmable computer, a selection of at least one of the pre-configured business processes. The method also includes presenting, via the programmable computer, a list of functional parameters associated with the selected business process, wherein the functional parameters are tasks requiring additional configuration to enable enrollment of the buyer and generating, via the programmable computer, one or more required test cases based on one or more functional parameters of the selected business process. A test case is a series of business procedures used to validate the selected business process. The method further includes tracking and certifying, via the programmable computer, test cases that have been successfully completed and deploying on behalf of the buyer, via the programmable computer, a live version of the selected best business process.

DETAILED DESCRIPTION OF THE INVENTION

Figure 1:
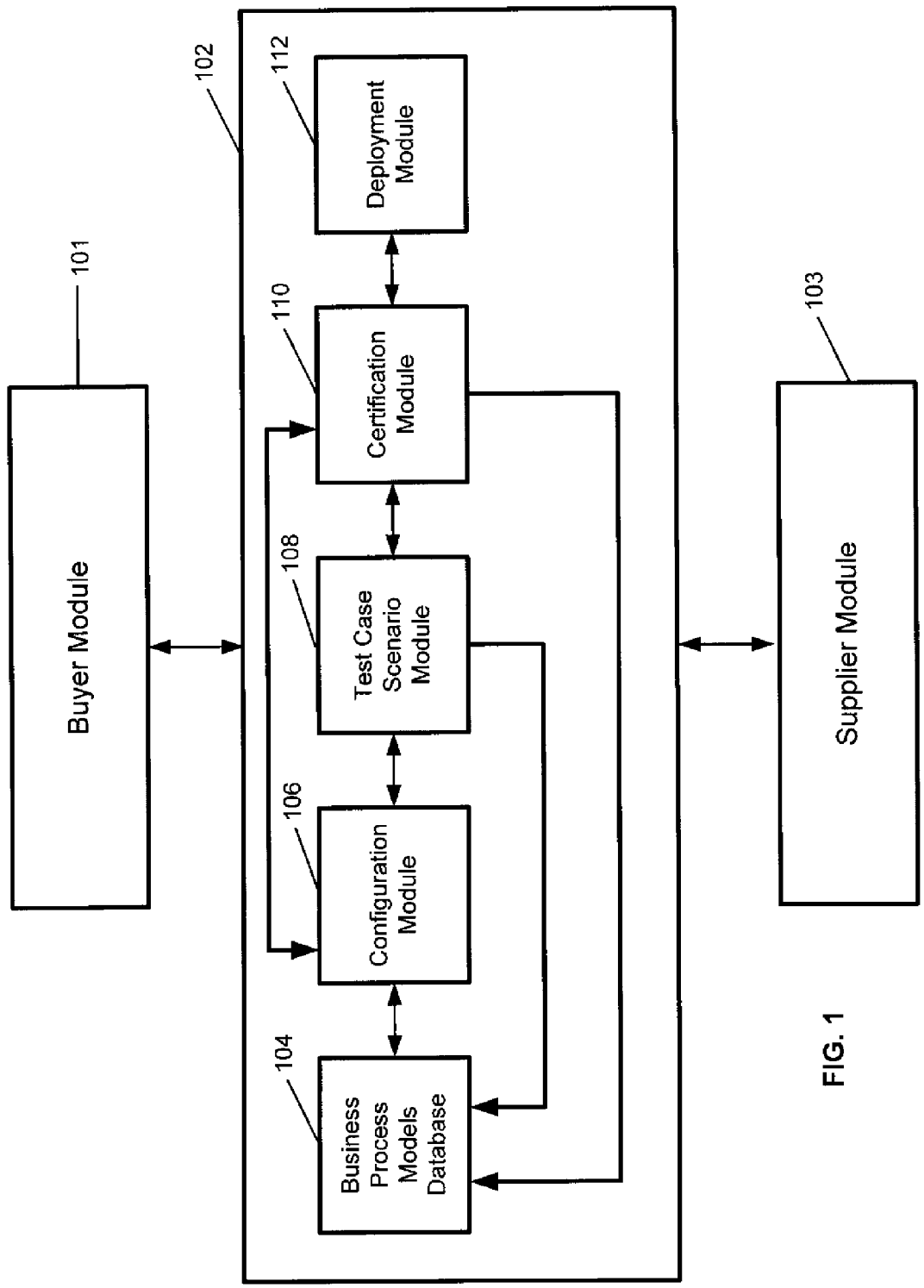
FIG. 1 shows a block diagram of a system for automatic enrollment of the buyers into the network according to an embodiment of the present invention.

Referring to FIG. 1 of the present application, there is illustrated a block diagram illustrating a system 100 for automatic enrollment of the buyers into a pre-existing network according to an embodiment of the invention. The system 100 includes a business network module 102 coupled to at least one buyer module 101 and at least one seller or supplier module 103. The business module 102 includes several components that essentially function to provide to the buyer of the buyer module 101, an option to select from at least one business model and to then to select from the pre-configured business processes based on the selected business model and further render functional parameters associated with the selected business process. The business network module 102 also functions to generate test cases for the selected business process, tracks and certifies the completion of the test cases and further functions to deploy a live version of the selected business by the buyer of the buyer module 101 into the business network module 102 in order to conduct business transaction with one more suppliers of the supplier module 103.

The business network module includes the following set of components, a business processes models database 104, a configuration module 106, a test scenario module 108, a certification module 110 and a deployment/production module 112. The configuration module 106 is coupled to the business processes models database 104 to retrieve and present to the buyer module 101 a list of functional parameters associated with the selected pre-configured business process. The test scenario module 108 is coupled to the configuration module 106 to generate required test cases based on the functional parameters of the selected business process. The certification module 110 is coupled to the test scenario module 108 to track and certify that the test cases have been successfully completed. The deployment/production module 112 is coupled to the certification module 110 to deploy a live version of the selected business process upon completion of the certification of the selected process. The details of the function of each of the components will be described in greater detail herein below.

Figure 2:
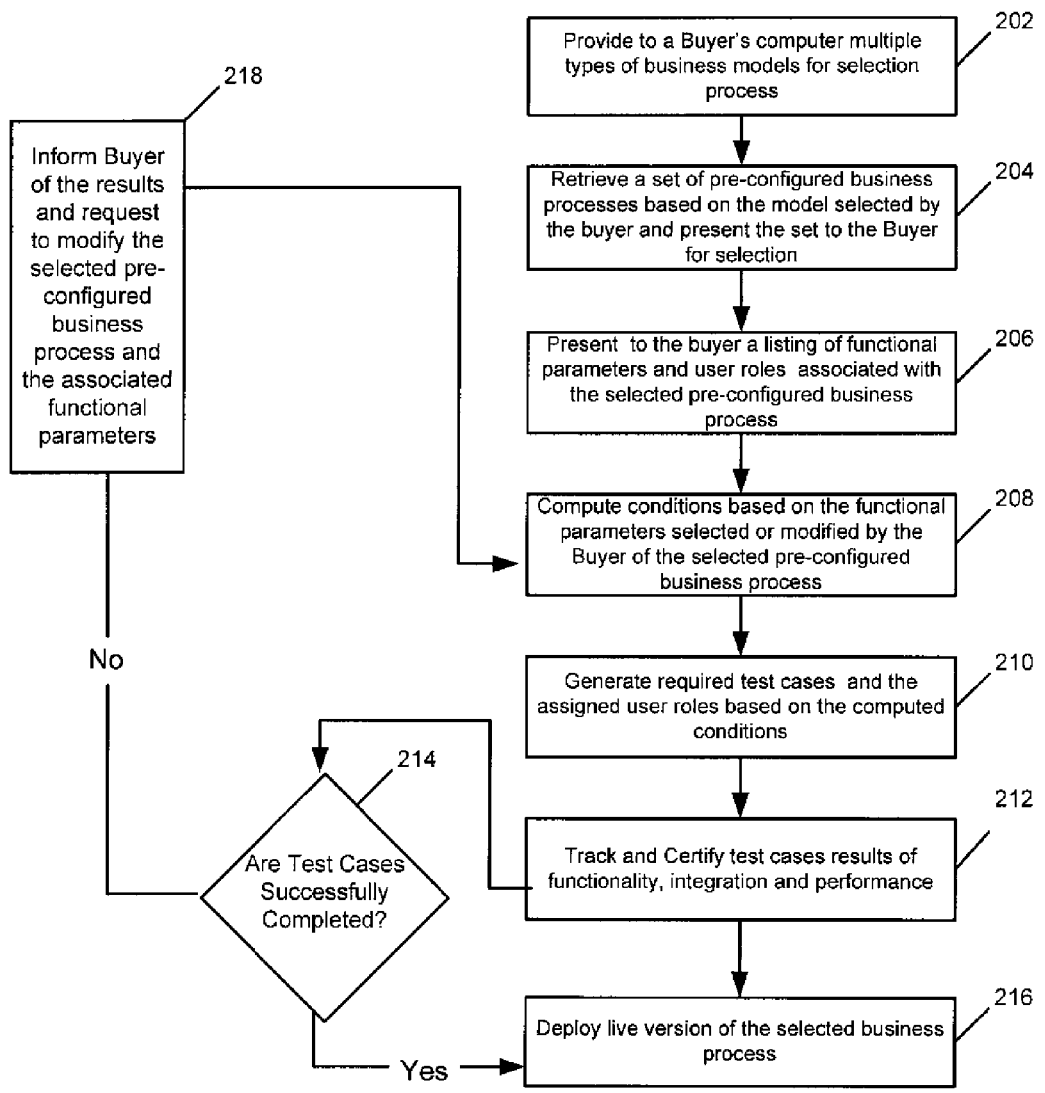
FIG. 2 shows a flow diagram for automatically enrolling buyers into the network according to an embodiment of the present invention.

Referring to FIG. 2 of the present application, there is illustrated a flow diagram illustrating a method for automatically enrolling the buyers into the network utilizing the components of the system 100. Initially in step 202, upon request from the buyer, the business network module 102 retrieves multiple pre-configured business models from the business processes models database 104. In a preferred embodiment, some of these business models include payment type (PT) (Total Settlement) process model and payment type plus (PTP) (OTP) process models. The payment type (Total Settlement) business model includes at least several types of electronic payment methods and requirements to approve the payments. The payment type plus business model includes the features/functions of payment type process model and additional functions required for a complete electronic service for business to business commerce. Some of those additional functions preferably include but are not limited to ability to issue purchase orders, process invoices, capture discounts, making payments within the Unites States and/or process orders and invoices, but not make payments, throughout North America. Upon selection of one of the business models by the buyer, at step 204, the business module 102 retrieves a set of pre-configured business processes from the business processes models database 104 and present this set of the business processes to the buyer's module 101. The pre-configured business processes are created based on several returns on investment (ROI) factors. One of the factors preferably includes process such as days to post, days to approve, on time payment etc. Another factor includes discounts such as discount capture rate, supplier penetration, invoice penetration, spend penetration, discount rate, discount annual percentage rate (APR), days payable outstanding (DPO). Another factor includes enforce audit approval, invoice quality assurance (QA) sampling. These ROI factors are applied with the industry standards which result in creation of business processes. Each of the pre-configured business processes comprise at least of a nickname of the business process, the name and description of the business process.

Table 1 below provides a list of names and descriptions of some of the pre-configured business processes provided to the buyer for selection if the buyer chose to select the payment type business model.

Table 2 below provides a list of names and descriptions of some of the pre-configured business processes provided to the buyer for selection if the buyer chose to select the payment type plus business model.

| Process Nickname | Process Name | Process Description |
| --- | --- | --- |
| PTP Process1 | Total Invoice Outsourcing (US) | Buyer processes paper invoices in house. Buyer places orders and makes payments within the United States. |
| PTP Process2 | Electronic Invoice Management (US) | Business Module system processes paper invoices for buyer. Buyer places orders and makes payments within the United States. |
| PTP Process3 | Total Invoice Outsourcing (North America) | Buyer processes paper invoices in house. Buyer places orders, but |

| Process Nickname | Process Name | Process Description |
| --- | --- | --- |
| PT Process1 | Automated Clearing House (ACH) Payments with No Approval | Buyer makes payments from bank account via ACH transfer. Payments do not need to be manually approved before being issued. |
| PT Process2 | Card Payments with No Approval | Buyer makes payments using a payment card account. Payments do not need to be manually approved before being issued. |
| PT Process3 | ACH and Card payments with No Approval | Buyer makes payments from bank account via ACH transfer or using a payment card account. Payments do not need to be manually approved before being issued. |
| PT Process4 | ACH, and Check Payments with No Approval | Buyer makes payments from bank account via ACH transfer or via paper check. Payments do not need to be manually approved before being issued. |
| PT Process5 | ACH, Check and Card Payments with No Approval | Buyer makes payments from bank account via ACH transfer or paper check, or using a payment card account. Payments do not need to be manually approved before being issued. |
| PT Process6 | ACH, Check and Wire Payments with No Approval | Buyer makes payments from bank account via ACH transfer, paper check, or wire transfer. Payments do not need to be manually . approved before being issued. |
| PT Process7 | ACH, Check, and Wire Payments with Approval | Buyer makes payments from bank account via ACH transfer, paper check, or wire transfer. Payments must be manually approved before being issued. |
| PT Process8 | ACH, Check, Wire, and Card Payments with No Approval | Buyer makes payments from bank account via ACH transfer, paper check, or wire transfer, or using a payment card account. Payments do not need to be manually approved before being issued. |
| PT Process9 | ACH, Check, Wire, and Card Payments with Approval | Buyer makes payments from bank account via ACH transfer, paper check, or wire transfer, or using a payment card account. Payments must be manually approved before being issued. |

-continued

| Process Nickname | Process Name | Process Description |
|---|---|---|
| PTP Process4 | Electronic Invoice Management (North America) | does not make payments, throughout North America. Business Module system processes paper invoices for buyer. Buyer places orders, but does not make payments, throughout North America. |

Although not shown in the tables above, each of the business processes also defines functional parameters, a set of roles for the parameters and related users for those roles. Furthermore, each of the business process also includes pre-configured sets of test cases that are created based on the businesses processes, the functional parameters associated with these processes and the user roles, as will be described in greater detail below.

Figure 3:
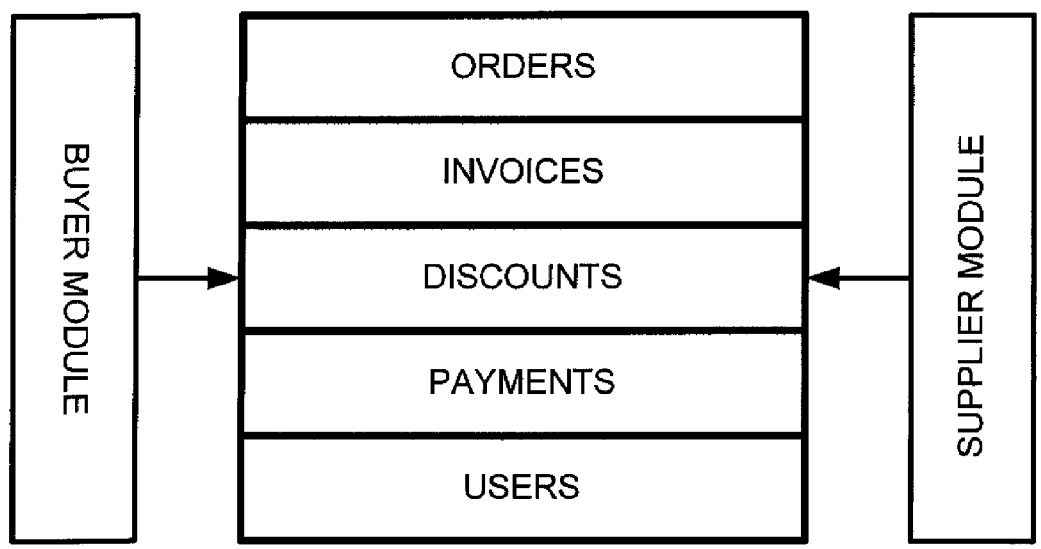
FIG. 3 shows an example of a graphical representation of a business process in accordance to one embodiment of the present invention.

The buyer's module 101 receives this set of pre-configured business processes and selects one of the business processes. This selection of the business processes triggers the configuration module 106 to present to the buyer module 101 a configuration page listing functional parameters defined/designed for the pre-configured selected business process at step 206. This listing provides the buyer module 104 with functional parameters associated with the selected business process which includes a brief description of the function to be performed by the buyer along with preferably a graphical representation of the selected business process. An example of the graphical representation of the selected business process is shown in FIG. 3. As illustrated in FIG. 3, the selected business model is the PTP business model and the corresponding PTP Process is the PTP Process1 which is the Total Invoicing Outsourcing (US). As shown in FIG. 3, some high level examples of the parameters include users, orders, invoices, discounts, and payments. More specifically, the functional parameters include payment account management information, integration file information, purchase order invoice information, non-purchase order invoice information, buyer-side invoices, request for checks, automatic paper invoice processing, disburse company's invoice format and discount programs, management information for bank and card payment accounts, file transmission, users roles information and other system integration parameters. The buyer performs the functions of the associated parameters by providing some input data which in turn results in setting of the parameters on the selected business process for the buyer. For example, a parameter of the selected business process as shown in FIG. 3 includes purchase order invoice and the function or task for that parameter includes the buyer to select one of the goods/products purchase order type, service purchase order type or blanket purchase order type and upon selection of one the types of purchase order, the next task for the buyer is to provide additional information related to the type of purchase order selected by the buyer which may result in on ore more additional tasks. This example enables the buyer to configure the parameters of the PTP Process1 for processing purchase order invoices. So, the buyers can modify and customize the functional parameters in the selected business process including the assigned user roles based on the buyer's actual business process.

Furthermore, based on the business process selected, the Configuration Module 106 in step 206 also assigns the user roles to one or many these tasks associated with the selected pre-configured business process. Some of these roles include and are not limited to administrator, payable/operations user, technical administrator, payment signer etc. Similar to the functional parameters, the assigned user roles are also modified in the selected business process based on the input data and the functional parameters performed by the buyer. Based on the business process selected, the configuration module 104 will have user roles configured. For example, if the user chooses to allow the buyer to void purchase orders and fix purchases orders in exception state, the application will create a procurement/sourcing user role (Pos) and any user that will have this role will be able to able to fix and manage Pos in exception state. In another example, if the buyer wants the invoices to go through financial approval, then the configuration module 106 will create a role of invoice approvers and the users assigned to this role will be able to approve the invoices.

In the next step 208, the module 108 computes conditions based on the functional parameters selected/modified by the buyer of the selected business process such that when a user chooses and/or configures a specific parameter/feature, the module identifies that the associated conditions are now testable. Thus, the conditions trigger the test cases. For example if the user chooses to have invoices greater than $1,000 routed for approval, the application will require the user to create a invoice over $1,000 and make sure the invoice is approved by the user who has the right role and approval limit to approve such a invoice. These conditions are a block of code, SQL, XML, etc that can be evaluated to have either succeeded or failed, a meta definition of the data set that they require in order to be evaluated, and optionally the events that should trigger the evaluation of the condition.

In step 210, the test scenario module 108 generates the required test cases to be evaluated and the assigned user roles for these test cases based on the conditions described above. A test case is defined as a series of business procedures including the input data and the output data of these business procedures that are required and relevant which can be further processed and/or tested. These test cases are preferably tested by the user assigned to the roles associated with the procedures. Some of these business procedures include but are not limited to approval, edits, escalation, exception, campaign, discount and tax. The module 108 generates these test cases based at least on the configuration parameters selected and/or modified by the buyer. According to an embodiment of the invention, the test cases to be evaluated are automatically generated by the test scenario module 108 upon triggering of pre-defined conditions/events. The condition modification is thus dynamic. The test case scenario module 108 will determine the conditions that are applicable and then based on the user parameter selection of the selected business process, the module 108 will present the user with appropriate test case.

In accordance with a preferred embodiment, the test cases may preferably be also requested by a buyer for evaluation. In such case scenario, the buyer will identify one or more business tasks of the parameter and the data required for evaluating the test cases for such tasks to the test scenario module 108. The module 108 in turn obtains the required data from an external source, preferably the supplier module 103 and populates such a data in the business task in order for the test case to be eligible for evaluation. For example, a buyer may have an attribute requiring for the supplier to provide comments on the invoice and that the buyer can preferably request for test cases to ensure that the supplier provides such comments.

The buyer module 101 in turn performs testing of the test cases by reviewing and validating the customized functionalities of the selected business process based on the corresponding high level parameters such as users, orders, invoices and payments as discussed above. The buyer module 101 further validates the integration of the RD module 102 with Enterprise Resource Planning (ERP) of the buyer's module 101 for payment and invoice processing etc.

In the next step 212, the certification module 110 functions to automatically track and certify test cases to make sure all the required test cases are successfully completed and the buyer configured module is ready for deployment (go-live). Specifically, the module 110 manages and tracks the results/successes of the test cases in step 212. The three main criterion used by the certification module 110 to track the results are functional results, integration results and performance results. The module 110 manages tracks and certifies the functionalities of the test cases being performed by the buyer's module. Each of the functional parameters assigned to the selected business process is tested to make certain that it successfully performs the required task(s). For example if a buyer is using systems applications and products (SAP) as their ERP system, the certification module will make sure all the test cases for SAP data exchange integration format for Pos, Invoices, Payments are valid and successfully been tested with the client ERP system. Another example is the scenario where the buyer has configured to have financial approval, the application will make sure the test case of invoice financial approval is executed i.e. there is a invoice with certain dollar limit is created and the appropriate users with the correct approval limit have approved the invoice.

The certification module 110 also manages and tracks successful integration of the buyer's module 101 with the RD module 102 prior to deployment. The module 110 will confirm that the transactions are created in the appropriate format that is accepted by the buyer's ERP system and the application will track that documents can be posted to the ERP system. For example if the user has SAP system the application will post an invoice IDOC to ERP system and only if the application receives a invoice status update the application will treat this integration to be successful.

The certification module 110 further monitors the testing and the performance based on the buyer's profile. For example the buyer chooses to be a mid size company, the test case scenario module 108 will create a test case of uploading 5000 purchase orders and the certification module 110 will track to make sure 5000 purchase orders are successfully uploaded in the approved SLA (service level agreement) and in order to allow the buyer to be certified prior to deployment.

Upon receiving completion of the required test cases, at step 214, it is determined whether the test cases have been successfully completed yield positive results. If the test cases are completed successfully and yield positive results, then the deployment module 112 deploys the live version of the selected best business process at step 216. However, if it is determined that the required test cases were not successfully completed and do not yield positive results, then at step 218, the buyer is informed of the process results including the details of the results and requested to further modify the selected business process. The buyer can preferably modify both business process and parameters to make sure that the rapid deployment application instance can appropriately work in production. Specifically, the buyer revisits the tasks of the functional parameters of the selected business process that yield negative results which results in the repeating the flow method at step 208 of further editing the selected business process The description provided herein discloses principles of the present invention, which are presented for purposes of illustration and not by way of limitation. Various modifications can be made by those skilled in the art without departing from the spirit and scope of the invention described herein.

What is claimed is:

1. A method
    providing to a buyer, via a programmable computer, at least one selectable business model;
    presenting to the buyer, via the programmable computer, a set of pre-configured business processes based on the selected model;
    receiving from the buyer, via the programmable computer, a selection of at least one of the pre-configured business processes;
    presenting, via the programmable computer, a list of functional parameters associated with the selected pre-configured business process, wherein the functional parameters are tasks requiring additional configuration to enable enrollment of the buyer;
    generating, via the programmable computer, one or more required test cases based on one or more functional parameters of the selected pre-configured business process, wherein the test case is a series of business procedures used to validate the selected pre-configured business process;
    tracking and certifying, via the programmable computer, the test cases that have been successfully completed; and
    deploying on behalf of the buyer, via the programmable computer, a live version of the selected pre-configured business process upon the certification of the test cases that have been successfully completed.

2. The method of claim 1 wherein said generating test cases comprising automatically computing conditions based on the functional parameters selected by the buyer.

3. The method of claim 1 wherein said generating test cases comprising automatically computing conditions based on the functional parameters modified by the buyer.

4. The method of claim 1 wherein said test cases are generated based upon the request by the buyer.

5. The method of claim 4 comprising retrieving data from a supplier and populating said data into the functional parameters to generate said test cases requested by the buyer.

6. The method of claim 1 comprising automatically assigning business roles to the buyer to perform the tasks of the functional parameters associated with the selected pre-configured business process.

7. The method of claim 6 wherein said business roles are pre-configured based on the functional parameters selected by the buyer.

8. The method of claim 6 wherein said business roles are modified based on the functional parameters configured/modified by the buyer.

9. The method of claim 6 further comprising presenting said test cases to the buyer for testing by the assigned business roles.

10. The method of claim 1 wherein said live version of the selected pre-configured business process is received by a supplier to initiate the business transaction with the buyer.

11. The method of claim 1 further comprising requesting the buyer to modify the functional parameters associated with the selected pre-configured business process if the certification of the test cases is unsuccessful.

12. The method of claim 1 wherein said certifying the test cases comprising verifying the functionality of the parameters of the selected pre-configured business process.

13. The method of claim 1 wherein said certifying the test cases comprising tracking successful integration of the buyer into a pre-existing network.

14. The method of claim 1 wherein said certifying the test cases comprising monitoring testing and performance of the test cases by the buyer.

15. A system comprising:
- a processor coupled to a memory, the processor configured to:
- provide the to a buyer at least one selectable business model and a set of pre-configured business processes based on the selected business model;
- receive from the buyer a selection of at least one of the pre-configured business process;
- retrieve and present to the buyer a list of functional parameters associated with the selected pre-configured business process, wherein the functional parameters are tasks requiring additional configuration to enable enrollment of the buyer;
- generate one or more required test cases required based on one or more functional parameters of the selected pre-configured business process, wherein the test case is a series of business procedures used to validate the selected pre-configured business process;
- track and certify that the test cases have been successfully completed; and
- deploy a live version of the selected pre-configured business process upon the certification of the test cases that have been successfully completed.

16. The system of claim 15 wherein said the memory comprise business roles assigned to the task of the functional parameters associated with the selected business process.

17. The system of claim 15 wherein said processor is configured to provide an option to select or modify the functional parameters of the selected pre-configured business process.

18. The system of claim 15 wherein said processor is configured to automatically generate test cases based on the functional parameters selected by the buyer.

19. The system of claim 15 wherein said processor is configured to generate test cases based on the functional parameters modified by the buyer.

20. The system of claim 15 wherein the live version of the selected pre-configured business process is received by a supplier to initiate the business transaction with the buyer.

21. The system of claim 15 wherein said processor to retrieve data from a supplier and populates said data into the functional parameters of the selected pre-configured business process, said processor generates test cases based on said populated data.

22. The system of claim 15 wherein said processor to verify functionalities of the parameters of the test cases of the selected pre-configured business process.

23. The system of claim 15 wherein said processor to track successful integration of the buyer module into a pre-existing network.

24. The system of claim 15 wherein said processor to monitor performance of the test cases validated by the buyer.

25. A non-transitory computer usable medium having a computer readable program code embodied therein, the computer readable program code adapted to be executed to implement a method comprising:
- providing to a buyer, via a programmable computer, at least one selectable business model;
- presenting to the buyer, via the programmable computer, a set of pre-configured business processes based on the selected model;
- receiving from the buyer, via the programmable computer, a selection of at least one of the pre-configured business processes;
- presenting, via the programmable computer, a list of functional parameters associated with the selected pre-configured business process, wherein the functional parameters are tasks requiring additional configuration to enable enrollment of the buyer;
- generating, via the programmable computer, one or more required test cases based on one or more functional parameters of the selected pre-configured business process, wherein the test case is a series of business procedures used to validate the selected pre-configured business process;
- tracking and certifying, via the programmable computer, the test cases that have been successfully completed; and
- deploying on behalf of the buyer, via the programmable computer, a live version of the selected pre-configured business process upon the certification of the test cases that have been successfully completed.

* * * * *